CONTOUR FINISHING MACHINE

Filed Oct. 8, 1964 3 Sheets-Sheet 1

INVENTOR.
JOHN W. BERG

INVENTOR.
JOHN W. BERG

INVENTOR.
JOHN W. BERG

United States Patent Office 3,339,311

Patented Sept. 5, 1967

3,339,311

CONTOUR FINISHING MACHINE

John W. Berg, La Mesa, Calif., assignor to Gerald L. Berg, La Mesa, Calif.

Substituted for abandoned application Ser. No. 401,543, Oct. 5, 1964. This application Oct. 8, 1964, Ser. No. 402,569

3 Claims. (Cl. 51—33)

ABSTRACT OF THE DISCLOSURE

A contour finishing machine having a moveable work table for holding a workpiece thereon in operable proximity to a rotatable surfacing implement which is vertically adjustable and mounted to an oscillatory column, the angle of which and degree of oscillation being adjustable with respect to the moveable work table.

This application is a substitute for application 401,543, filed on Oct. 5, 1964, for Contour Finishing Machine, and now abandoned.

This invention relates generally to grinding machines and particularly to a contour grinding machine capable of grinding curved as well as plane surfaces.

*Background*

Prior art contour grinding machines use a cam-follower or template-follower to guide a grinding wheel over the surface of a workpiece to grind thereon a contour duplicating the contour of the cam or template. Templates, except the simplest kind, are expensive, the mechanism are following the contours is complicated, and contours reproduced thereby are often inaccurate. With such machines a different template is required for each different contour, and contours for which templates are not available cannot be ground.

The instant invention is a contour grinding machine that uses a grinder mounted on an adjustable axis, providing accurate variable adjustment to facilitate grinding and like processing of both plane and curved contours for mass production of duplicate or co-operating machined parts.

*Objects*

It is a principal object of this invention to provide grinding apparatus capable of producing finished, machined parts, each having a contour which may be straight or curved, ranging from flat to parabolic, and including simple an annularly concave and convex surfaces and virtually any desired contour.

It is another object of this invention to provide grinding and/or finishing apparatus capable of producing matching concave and convex fittings.

It is still another object of this invention to provide grinding apparatus in which the adjustments for producing various contours are variable between upper and lower limits.

With these and other objects definitely in view, this invention consists in the novel combination and arrangement of elements as will be hereinafter fully described in the specification, particularly pointed out in the claims, and illustrated in the drawings that form a material part of the disclosure, and in which:

Similar characters of reference indicate similar or identical elements and portions throughout the specification and throughout the views of the drawing.

*Detailed description*

Figure 1:
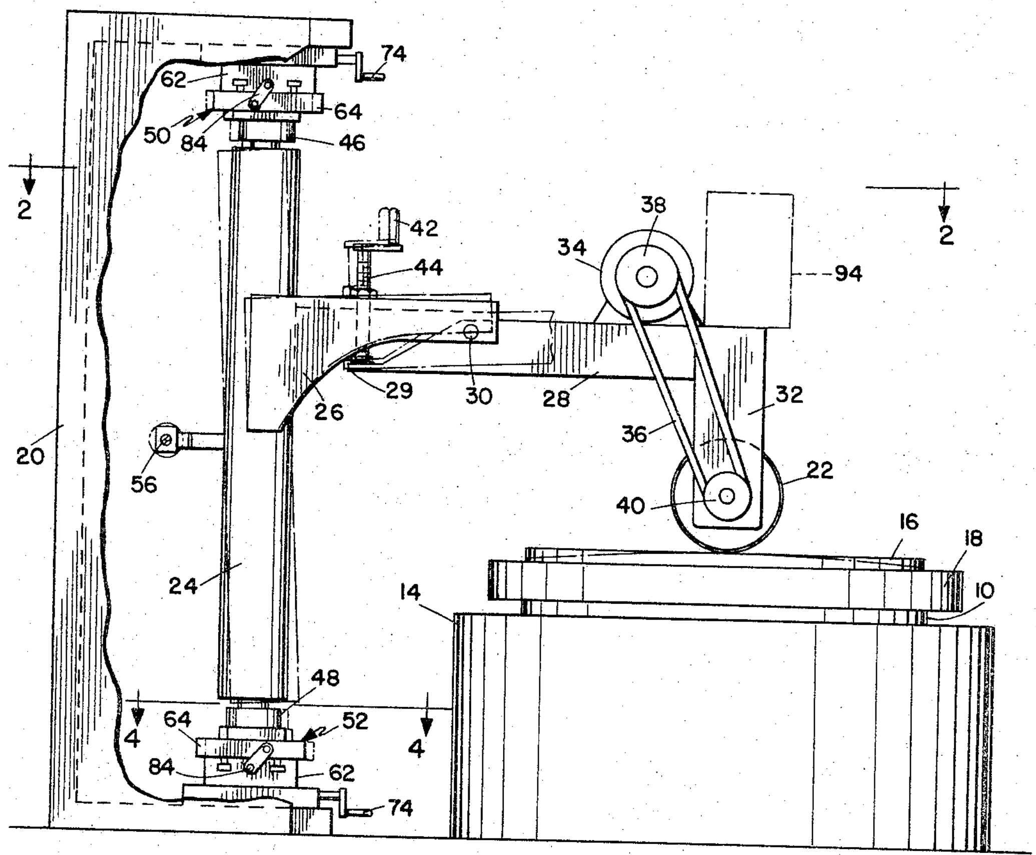
FIGURE 1 is a side elevation view of the grinding apparatus.

A preferred embodiment of the instant invention, including the essential features described and claimed in combination hereinafter, is illustrated in the drawings. For simplicity, accessory apparatus for rotating turntable 10 and operating hydraulic actuator 12 is not shown, electrical and other apparatus of various kinds considered suitable for these purposes being well known in the art.

Turntable 10 is rotatably mounted on fixed pedestal 14, and workpiece 16 is held on turntable 10 by chuck 18. Chuck 18 may be of the rotary vacuum or other suitable type. As illustrated in this embodiment, workpiece 16 is circular or cylindrical, although other configurations with suitable chucks may be used.

Located adjacent to pedestal 14, frame 20 holds the grinding mechanism suspended above workpiece 16, grinding wheel 22 being in contact with the upper face thereof. While a grinding wheel is illustrated, an endless abrasive belt, buffing wheel, wire brush wheel, or the like, may be substituted therefor.

The structure for holding grinding wheel 22 in contact with workpiece 16 includes generally vertical column 24 rotatably mounted in frame 20, bracket 26 secured to column 24, horizontally extending arm 28 attached by pivot 30 to bracket 26, and downwardly extending bifurcated fork 32. Grinding wheel 22 is journaled in fork 32 and operatively engaged with electric motor 34 for continuous rotation by belt 36 and pulleys 38 and 40.

Arm 28 is pivoted vertically at pivot 30 to provide means for adjusting the height of grinding wheel 22 relative to workpiece 16. The height is adjusted by handcrank 42 and screw shaft 44, said screw shaft being operatively engaged with bracket 26 and the end 29 of arm 28 adjacent pivot 30.

Figure 2:
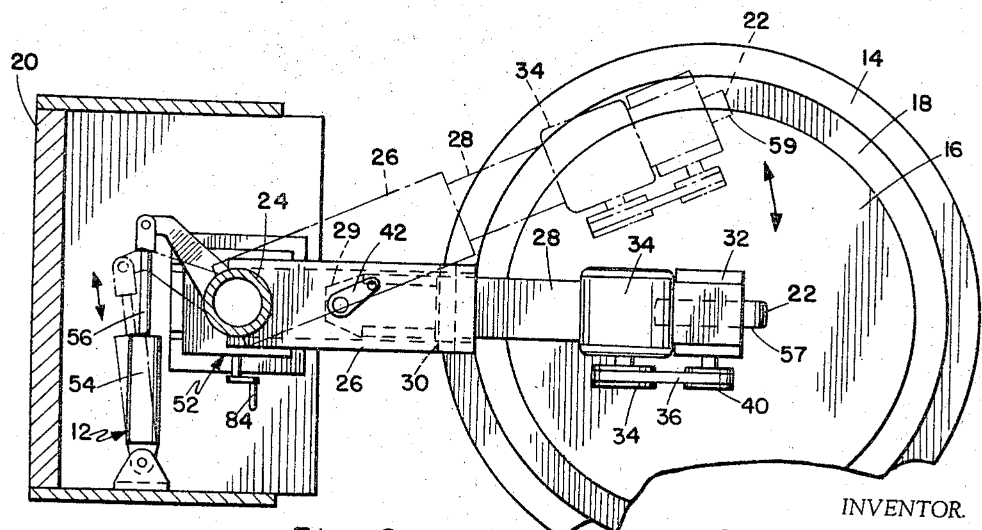
FIGURE 2 is a sectional view taken on line 2—2 of FIGURE 1.
Figure 3:
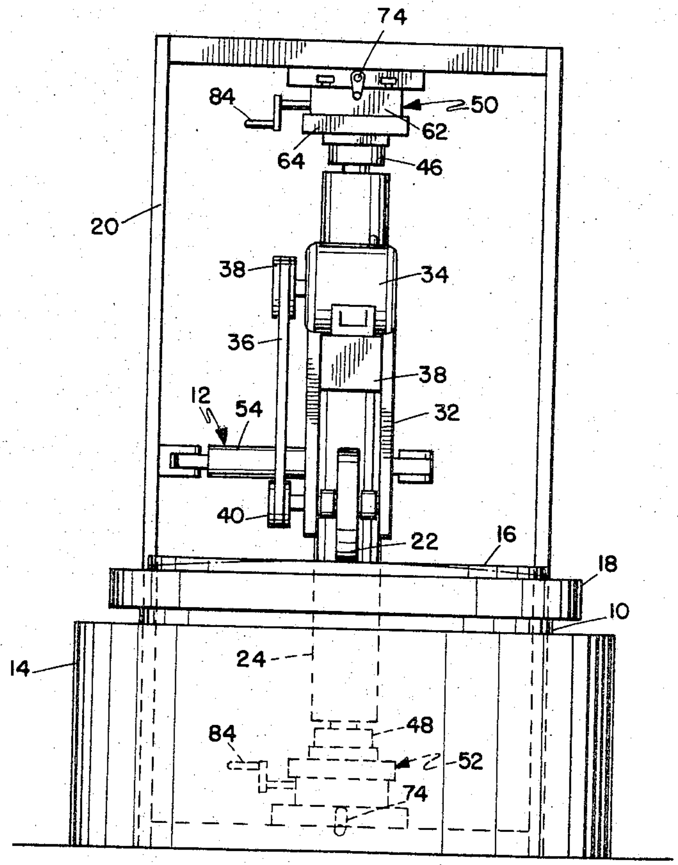
FIGURE 3 is an end elevation view of the grinding apparatus.

To provide means for sweeping grinding wheel 22 in an arc across workpiece 16, column 24 is mounted in self-aligning bearings 46 and 48, said bearings being supported for lateral movement on adjusting means 50 and 52. Adjusting means 50 and 52 are attached to frame 20 in a manner and for a purpose to be described hereinafter. Thus column 24 is free to rotate in bearings 46 and 48, an oscillatory motion being imparted to column 24 by hydraulic actuator 12, cylinder 54 being pivotally attached to frame 20 and piston rod 56 being pivotally attached at an intermediate point to column 24. As column 24 swings, arm 28 carries grinding wheel 22 in an arc across the upper face of workpiece 16 as indicated by the arrow and positions 57 and 59 in FIGURE 2.

In position 57, grinding wheel 22 is located initially at the exact center of the upper face of workpiece 16. In position 59, grinding wheel 22 is located at the perimeter of workpiece 16, this being the outer limit of the sweeping motion, position 57 being the inner limit.

The novel feature of the instant invention which, in combination with the structure described above, permits grinding contours ranging from straight lines through various curvatures, is provided by operation of the adjusting means 50 and 52 so that either or both ends of column 24 may be displaced laterally in any direction.

Figure 5:
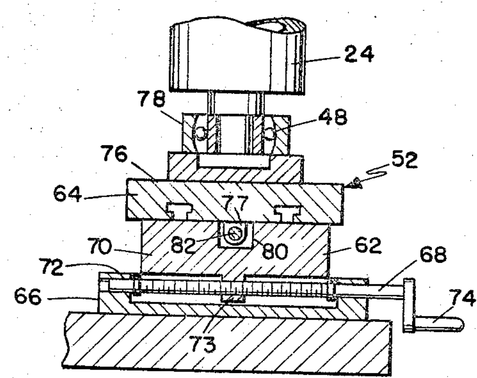
FIGURE 5 is a sectional view taken on line 5—5 of FIGURE 4.

As illustrated in FIGURE 1, bearings 46 and 48 are attached at the upper and lower ends of column 24 to adjusting means 50 and 52, respectively, each adjusting means having two sections 62 and 64 interposed between each bearing 46 and 48, respectively, and frame member 20, as more clearly shown in FIGURE 5. Sections 62 and 64 are angularly displaced through an arc of 90° to provide the above mentioned lateral displacement.

Section 62 includes a base member 66 suitably secured to frame 20. Rotatably mounted in base 66 but secured against axial movement is a screw threaded actuating shaft 68 provided with a crank handle 74. Block 70 is slidably mounted on surface 72 of base 66 through engagement of an integral nut portion 73 which is threadably engaged with actuating shaft 68. With reference to FIGURE 5 it is evident that rotation of crank handle 74 will move block 70 laterally in a plane including the axis of shaft 68.

Section 64 includes a block 76 to which is suitably secured the outer race 78 of bearing 48. Block 76 is provided with an integral nut portion 77 which extends into a slot 80 in block 70 and is operatively engaged by a screw threaded shaft 82 journalled in block 70. Shaft 82 is provided on its outer end with an actuating hand crank 84. Rotation of crank 84 will therefore move the block 76 in a plane at right angles to the plane of actuating shaft 68.

Similar means 50 is provided at the top of column 24 to adjust bearing 46. The adjusting means shown and described herein is that commonly used to provide vernier adjustment in mill vises. This specific adjusting means is shown as an example only, it being understood that other suitable means providing the necessary lateral adjustment may be substituted therefor.

Figure 4:
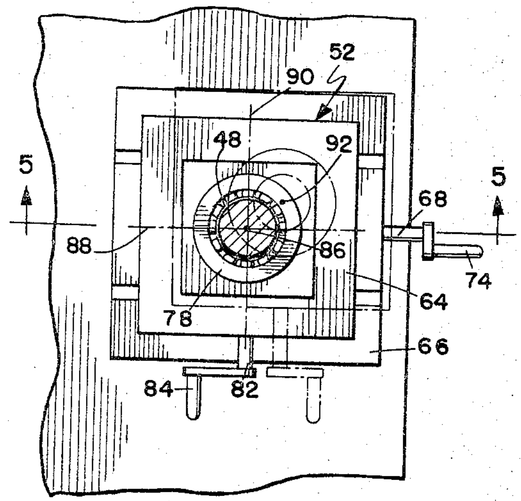
FIGURE 4 is a bottom plan view showing the sweep axis displacement.

Referring now to FIGURE 1, handcranks 74 are used individually to tilt the axis or together to tilt or otherwise displace the axis of column 24 in a first plane, and handcranks 84 are used for similar tilting or displacement in a second plane at right angles to said first plane. Thus it is obvious that each end of column 24 may be moved to a point defined by $x$-axis and $y$-axis rectangular coordinates, and said point may be at the same or at a different location relative to the point of origin at each end of column 24. These adjustments are illustrated in FIGURE 4, wherein the axis of column 24 is shown initially at the point of origin 86 of $x$-axis 88 and $y$-axis 90 and finally at point 92 in a rectangular coordinate graph, the final position having been attained by rotating handcranks 74 to move section 62 to the right along $x$-axis 88 and by rotating handcrank 84 to move section 64 upward along $y$-axis 90.

When the axis of column 24 is adjusted to be absolutely vertical, grinding wheel 22 moves in an arc in the same horizontal plane as the upper face of workpiece 16 and grinds a flat surface when said axis is tilted, grinding wheel 22 moves in an arc in a different plane from the plane of said face and grinds a tapered or curved surface dependent on the degree and direction of tilt. Dependent on tilt, a tapered surface may be reduced gradually in thickness outwardly or inwardly and a curved surface may be concave or convex.

Handcranks 74–84 are preferably calibrated for predetermined tilt angles, the axis of column 24 being thereby adjusted for the desired contour, the axis adjustments being coordinated with the height adjustment of handcrank 42 to position grinding wheel 22 at the exact center of the upper face of workpiece 16. Power is applied to rotate turntable 18 and grinding wheel 22 and sweep grind wheel 22 at a constant speed. Hydraulic actuator 12 sweeps grinding wheel 22 across the upper face of workpiece 16 in an arc determined by the orientation of the column 24 axis, said arc having a chord substantially equal to the radius of the upper face of workpiece 16. Optionally, weight 94 may be mounted on arm 28 directly above grinding wheel 22 to eliminate uneven grinding due to vibration or an initial rough surface. The rotation and sweep speeds may be changed to provide maximum efficiency according to the nature of workpiece 16 and roughness or fineness of the grinding or finishing process.

While I have shown the axis of the column 24 as being mounted so that it may be tilted relative to the axis of the turntable 10 it should be understood that the same results may be accomplished by fixedly mounting the axis of the column 24 and mounting the turntable so that the axis thereof may be tilted.

It should be noted also that the effective sweep may be restricted to one half or other fraction of the workpiece, for example, extending from the center to one edge only, and the workpiece in turning will then be ground or otherwise finished with transverse concavities or convexities of annular form extending around the workpiece. Obviously other configurations can be obtained by the use of this contour finishing machine.

Figure 6:
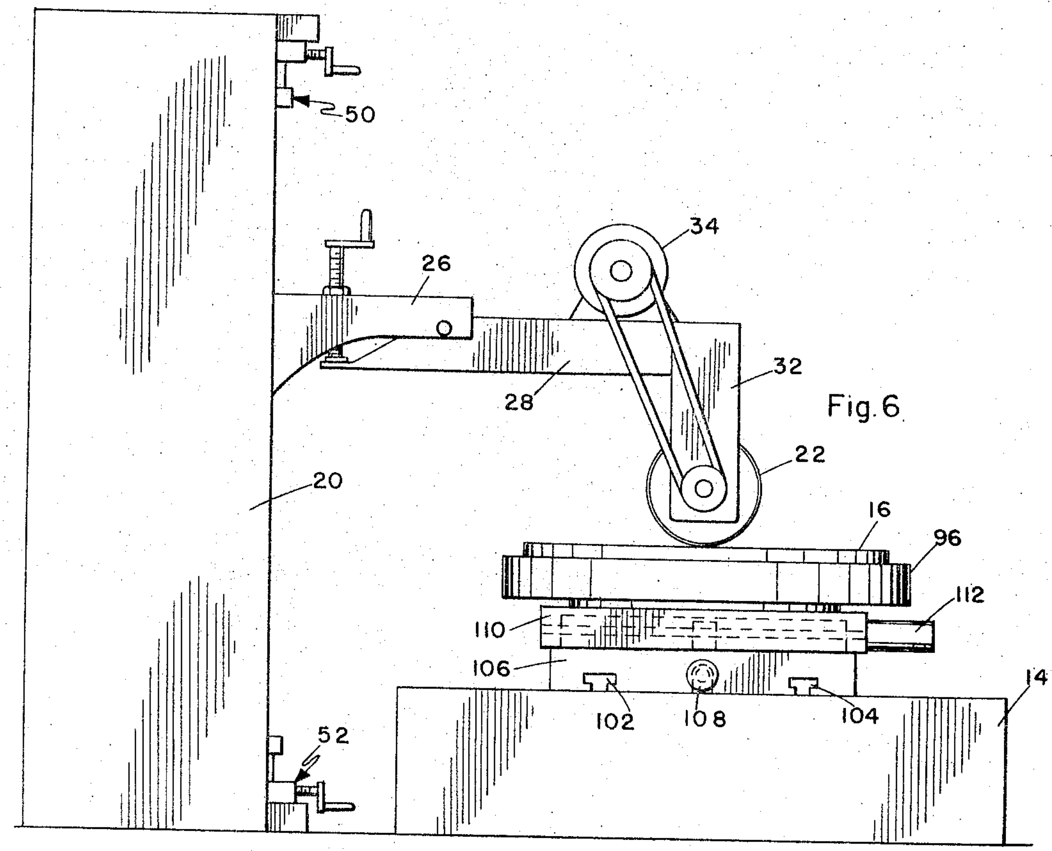
FIGURE 6 is a side elevation of a modification of the finishing apparatus.
Figure 7:
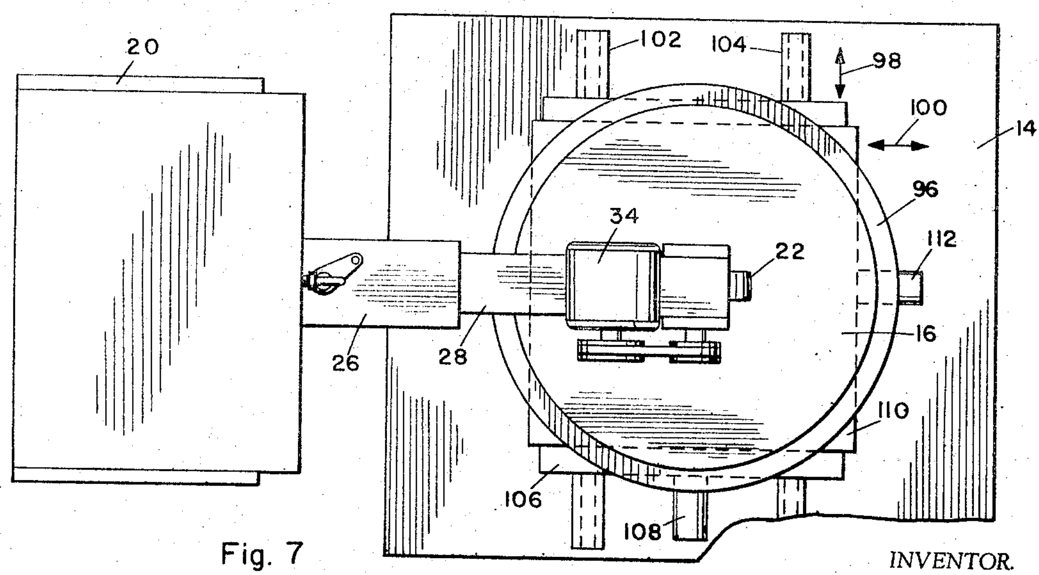
FIGURE 7 is a top view of the modification shown in FIGURE 6.

In FIGURES 6 and 7 I have shown a modification of the invention in which the workpiece is carried on a supporting means that is reciprocable rather than rotatable on a fixed axis In this form the work finishing means 22 and the support therefor are similar to that shown and described in the previous modification. However, worktable 96 is movable in two directions at right angles to each other as indicated by the arrows 98 and 100. To accomplish this base 14 is provided with a pair of spaced rails 102 and 104 upon which is slidably mounted a base plate 106 for movement in the direction of arrow 98 by means of a conventionally mounted reversible motor 108 and worm gear (not shown). A second base plate 110 is mounted on the first base plate 106 to reciprocate in a direction at right angles thereto, as indicated by arrow 100, a motor 112 and worm gear assembly similar to that used for moving base plate 106 being utilized. Worktable 96 is secured by any suitable means to base plate 110. Suitable motor control means (not shown) are provided to give any desired translatory movement of 106 and 110.

It is understood that minor variation from the form of the invention disclosed herein may be made without departure from the spirit and scope of the invention, and that the specification and drawings are to be considered as merely illustrative rather than limiting.

I claim:

1. Contour surfacing apparatus comprising:
a worktable movable about an axis;
means for holding a workpiece on said worktable;
rotatable surfacing means;
a frame member;
spaced self-aligning anti-friction bearings mounted on said frame member on an axis generally parallel to the axis of said worktable;
a supporting column journalled in said bearings;
means supporting said surfacing means from said supporting column in a position to move in an arcuate path across said worktable;
means to oscillate said column; and
means to individually adjust the lateral position in two axes of said bearings on said frame whereby the axis of said column may be tilted with respect to the axis of said worktable.

2. The combination of claim 1 in which said last mentioned means consists of a pair of blocks movably mounted at right angle to each other between each bearing and the frame member, one of said blocks being secured to an outer race of each bearing and another of said blocks being movably mounted with respect to the frame.

3. The combination of claim 1 including means to adjust the position of the surfacing means with respect to the supporting column thus adjusting the surfacing means relative to the worktable.

References Cited

UNITED STATES PATENTS

| | | | |
|---|---|---|---|
| Re. 13,918 | 5/1915 | Bauer | 51—33 XR |
| 1,520,703 | 12/1924 | Ericsson | 51—55 |
| 2,651,888 | 9/1953 | Comstock | 51—33 |
| 2,821,813 | 2/1958 | Degler | 51—105 |
| 2,994,568 | 8/1961 | Downs | 308—59 |

HAROLD D. WHITEHEAD, *Primary Examiner.*